UNITED STATES PATENT OFFICE.

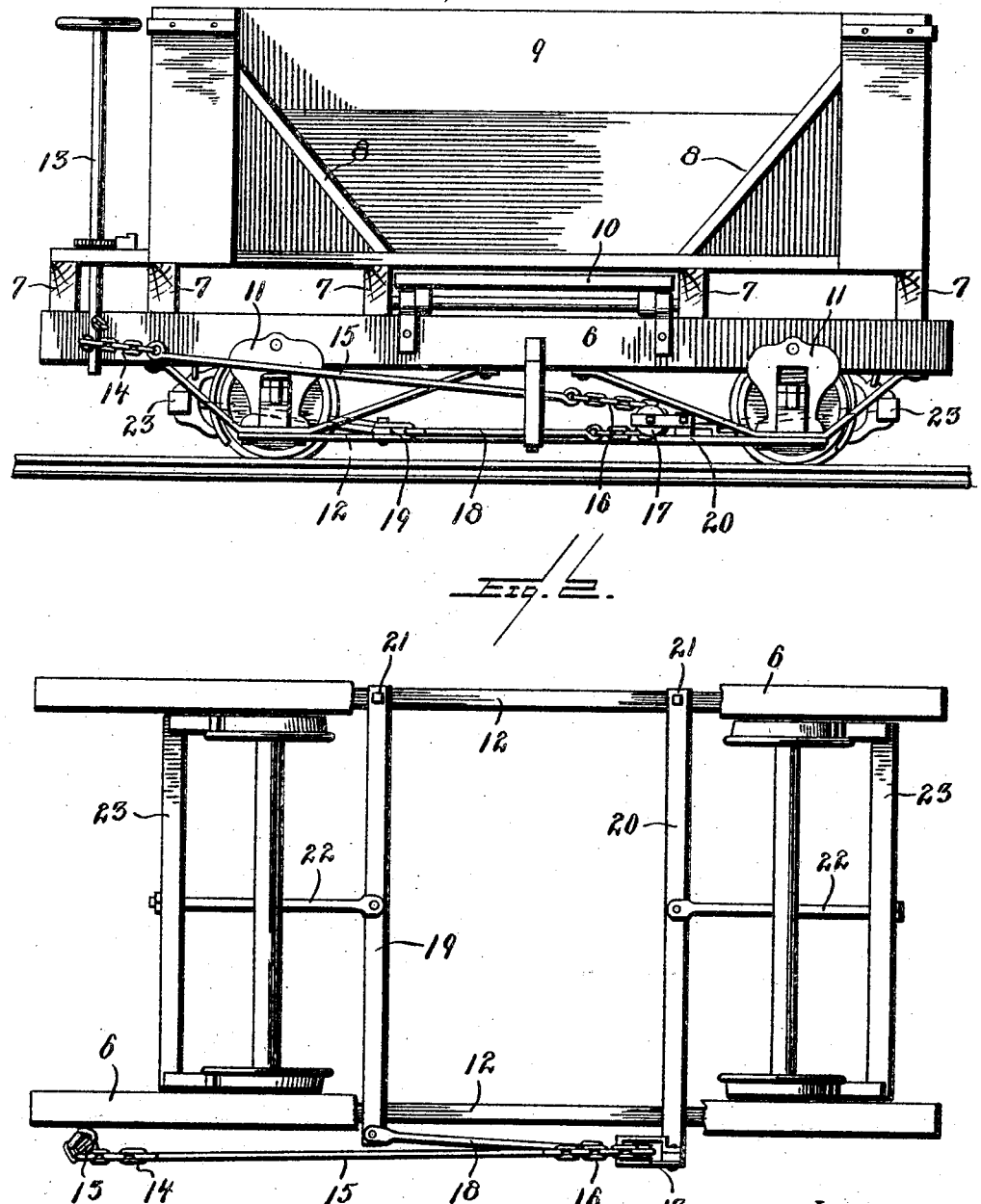

ROBERT FRANKLIN PIERCE, OF SHAW, GEORGIA.

RAILWAY CAR AND BRAKE.

No. 820,366.　　　　Specification of Letters Patent.　　　　Patented May 8, 1906.

Application filed November 23, 1905. Serial No. 288,708.

*To all whom it may concern:*

Be it known that I, ROBERT FRANKLIN PIERCE, a citizen of the United States, residing at Shaw, in the county of Walker and State of Georgia, have invented new and useful Improvements in Railway Cars and Brakes, of which the following is a specification.

This invention is applicable to railway-cars, and comprises particularly a brake arrangement suitable for use with cars having dumping-bottoms, and comprises means whereby the brakes may be applied to the wheels of trucks at both ends of the car, the arrangement being such that the connection between the brakes on the opposite ends does not interfere with the drop of the car-doors or the dump of the contents of the car therefrom.

The invention will be found very useful in mine-cars having single trucks, in connection with one of which the invention is illustrated in the accompanying drawings.

A hand-brake is shown; but the invention may be applied to air-brakes

In the drawings, Figure 1 is a side elevation of a car provided with the improvement, part of the side of the car being removed to show the interior construction thereof. Fig. 2 is a plan view of the brake-gear.

Referring specifically to the drawings, the car has side sills 6, which support cross-sills 7, upon which the superstructure is built, having a hopper-bottom produced by two inclined ends 8 and sides 9, which incline to hinged doors 10, which drop at the middle to dump the contents of the car therefrom.

The car shown has a single truck at each end. The pedestals 11 are connected on each side by bars 12, which serve to stiffen the trucks and also to support some of the brake parts, as hereinafter referred to. The brake-shaft 13 and its hand-wheel are mounted upon one end of the car, at the corner thereof, so that the lower end of the shaft extends down beside the sill on the outer side thereof. The shaft is connected by a chain 14 to a brake-rod 15, which is connected to a chain 16, which passes around a pulley 17 and is connected in turn to a rod 18, which is connected to one end of one brake-lever 19. The pulley 17 is connected to the end of the other brake-lever 20. These levers extend across under the car-body and as near as convenient to the trucks. They are fulcrumed at one end at 21 to the bar 12 on one side and extend across to the opposite bar, on which the free ends rest or are supported. At or about the middle they are connected by links 22 to brake-beams 23 for the respective trucks.

It will be seen that the arrangement is such that the brake-gear does not cross or obstruct the central space under the car through which the hopper discharges, the brake-levers being located near to the trucks and beyond the swing of the doors and the brake-chains and rods being located at the side of the car, also out of the way of the doors. When the brake is put on, the free ends of the levers are drawn toward each other, thus applying the brakes on both trucks.

The construction has the merit of simplicity and cheapness, and also the parts are conveniently accessible for inspection and repair.

I claim—

1. The combination with a dumping-car having doors which drop between the trucks, of a brake-gear having a part for each truck, including a lever which extends crosswise under the body of the car and connections between the respective levers, said connections being located at the side of the car outside of the wheels and out of the way of the doors.

2. The combination with a dumping-car having bottom doors, of a brake-gear having opposite brake-levers which are fulcrumed at one side of the car and extend across under the body of the car between the trucks to the other side where they are connected to the brake-rod, said levers being located toward the ends of the cars respectively, with a space therebetween under said doors.

3. The combination of a car having side bars extending lengthwise between the trucks, brake-levers fulcrumed on one of said bars and extending across and resting at their free ends upon the other bar, and a power device connected to said levers.

4. A car having side bars connecting the pedestals of trucks at the opposite ends, a brake-beam for each truck, levers connected to the respective beams and fulcrumed at one end upon one bar and supported at the other end upon the other bar, and a brake-rod and power device connected to the levers, to operate the same.

5. The combination of a car having side bars extending along under the body thereof, a pair of brake-levers fulcrumed upon one of said bars and connected to brakes for opposite trucks, said levers extending across under the body of the car and resting at their free ends upon the other bar, a chain connected to one lever and to the brake-shaft, and a pulley connected to the other lever and around which the chain extends.

In testimony whereof I have signed my name to this specification in the presence of two subscribing witnesses.

ROBERT FRANKLIN PIERCE.

Witnesses:
J. G. HENDERSON,
JOHN W. BALL.